United States Patent
Hirakawa et al.

(10) Patent No.: US 10,150,353 B2
(45) Date of Patent: Dec. 11, 2018

(54) DOOR STRUCTURE FOR VEHICLE

(71) Applicant: Honda Motor Co., Ltd., Tokyo (JP)

(72) Inventors: Tadashi Hirakawa, Wako (JP); Tamaki Mikami, Wako (JP); Takuro Nishida, Wako (JP); Takafumi Takayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/466,244

(22) Filed: Mar. 22, 2017

(65) Prior Publication Data

US 2017/0274744 A1    Sep. 28, 2017

(30) Foreign Application Priority Data

Mar. 22, 2016   (JP) ................................. 2016-057452

(51) Int. Cl.
  *B60J 5/00*   (2006.01)
  *B60J 5/04*   (2006.01)
(52) U.S. Cl.
  CPC .......... *B60J 5/0456* (2013.01); *B60J 5/0413* (2013.01); *B60J 5/0425* (2013.01); *B60J 5/0437* (2013.01); *B60J 5/0447* (2013.01)
(58) Field of Classification Search
  CPC ...... B60J 5/0456; B60J 5/0413; B60J 5/0425; B60J 5/0437; B60J 5/0447
  See application file for complete search history.

(56) References Cited

U.S. PATENT DOCUMENTS

| | | | | |
|---|---|---|---|---|
| 5,580,120 A | * | 12/1996 | Nees | B60J 5/0444 296/146.6 |
| 5,800,007 A | * | 9/1998 | Cho | B62D 25/04 296/146.6 |
| 5,868,456 A | * | 2/1999 | Kowalski | B60J 5/0444 296/146.6 |
| 6,135,541 A | * | 10/2000 | Geise | B60J 5/0437 296/1.03 |
| 7,270,364 B1 | * | 9/2007 | Kim | B60J 5/0433 296/146.6 |
| 2007/0210612 A1 | * | 9/2007 | Kidachi | B60J 5/0418 296/146.6 |

(Continued)

FOREIGN PATENT DOCUMENTS

| | | | | |
|---|---|---|---|---|
| GB | 2296475 A | * | 7/1996 | ............ B60J 5/0437 |
| JP | 9-175180 A | | 7/1997 | |

(Continued)

OTHER PUBLICATIONS

Office Action dated Nov. 14, 2017, issued in counterpart Japanese Application No. 2016-057452, with English translation (5 pages).

*Primary Examiner* — Lori L Lyjak
(74) *Attorney, Agent, or Firm* — Westerman, Hattori, Daniels & Adrian, LLP (57) ABSTRACT

A rear side door 20 designed to open and close an opening formed in a body 40 includes an inner panel 21 and a door beam 24. The door beam 24 is mounted on an inner panel 21 through a bracket 25 placed between the door beam 24 and the inner panel 21, and a patch member 26 is disposed on a tip part 24A of the door beam 24 at a position overlapping the tip part 24A of the door beam 24 in the vehicle widthwise direction.

8 Claims, 5 Drawing Sheets

(56) References Cited

U.S. PATENT DOCUMENTS

| | | | | |
|---|---|---|---|---|
| 2009/0026795 A1* | 1/2009 | Tate | ................ | B60J 5/0429 |
| | | | | 296/146.6 |
| 2010/0225141 A1* | 9/2010 | Mori | ................ | B60J 5/0429 |
| | | | | 296/146.6 |
| 2013/0168997 A1* | 7/2013 | Kurokawa | ............ | B60J 5/0443 |
| | | | | 296/146.6 |
| 2013/0328352 A1* | 12/2013 | Kato | ................ | B60J 5/0458 |
| | | | | 296/187.12 |
| 2016/0059677 A1* | 3/2016 | Yamazaki | ............ | B60J 5/0429 |
| | | | | 49/501 |
| 2016/0303953 A1* | 10/2016 | Fukahori | ............ | B60J 5/0429 |
| 2017/0246936 A1* | 8/2017 | Takagai | ............ | B60J 5/0437 |

FOREIGN PATENT DOCUMENTS

| | | | | |
|---|---|---|---|---|
| JP | 3168225 B2 | 5/2001 | | |
| JP | 2004-224120 A | 8/2004 | | |
| JP | 2004345507 A | * 12/2004 | | |
| WO | WO-2008062759 A1 | * 5/2008 | ............ | B60J 5/0425 |
| WO | WO-2008062761 A1 | * 5/2008 | ............ | B60J 5/0425 |

* cited by examiner

DOOR STRUCTURE FOR VEHICLE

CROSS-REFERENCE OF RELATED APPLICATION

This application claims priority of Japanese Patent Application No. 2016-057452 filed in Japan on Mar. 22, 2016, the entire contents of which are incorporated herein by reference.

TECHNICAL FIELD

The present invention relates to a door structure for a vehicle.

BACKGROUND OF THE INVENTION

Existing doors mounted on vehicles include ones having an outer panel and an inner panel. Some of these doors have, between the outer and inner panels, a member for absorbing an impact applied from outside the side of the outer panel, e.g., an impact bar (for example, see Japanese Patent No. 3168225). This impact bar installed in the door is mounted on and supported by a support member which is secured on an inner face of the inner panel by welding.

SUMMARY OF INVENTION

However, in the door disclosed in Japanese Patent No. 3168225, if the impact applied from the side is large, the impact bar sometimes splits the support member. If the support member is split, the support member is no longer able to support the impact bar, and therefore the impact bar (door beam) might be fallen off from the inner panel.

A problem to be solved by the present invention is to provide a door structure for a vehicle capable of restraining a door beam from being fallen off when an impact is applied on a door.

(1) In order to solve the above problem, a door structure for a vehicle according to an aspect of the present invention is a door structure for a vehicle including a door (a rear side door 20 according to embodiments, for example) which is designed to open and close an opening formed in a body (a body 40 according to the embodiments, for example), the door structure being characterized in that the door includes: a door panel (an inner panel 21 according to the embodiments, for example); and a long door beam (a door beam 24 according to the embodiments, for example) which is mounted to an outer side of the door panel in a vehicle widthwise direction of the body and disposed along a longitudinal direction of the body, the door beam is mounted on the door panel through a bracket (a bracket 25 according to the embodiments, for example) placed between the door beam and the door panel, and a patch member (a patch member 26 according to the embodiments, for example) is disposed on a tip part of the door beam at a position overlapping the tip part of the door beam in the vehicle widthwise direction.

(2) The door structure for a vehicle according to the aspect of the present invention may be configured such that the patch member includes: a platy first part (a first part 26A according to the embodiments, for example); and a second part (a second part 26B according to the embodiments, for example) which bends from the first part, the first part is placed further inward in the vehicle widthwise direction than an inner end side of the door beam in the vehicle widthwise direction (an inner end side 24B of the door beam 24 in the vehicle widthwise direction according to the embodiments, for example), and the second part is placed starting from a front position of the first part.

(3) Further, the door structure for a vehicle according to the aspect of the present invention maybe configured such that the patch member is joined to the bracket through the first part, and the second part is spaced from the bracket (the second part 26B of the patch member 26 and the bracket 25 according to the embodiments are spaced from each other, for example).

(4) Further, the door structure for a vehicle according to the aspect of the present invention maybe configured such that the bracket includes: a beam-side joint part (a first plate part 25A of the bracket 25 according to the embodiments, for example) which is located further inward in the vehicle widthwise direction than the inner end side of the door beam in the vehicle widthwise direction and joined to the door beam; and a panel-side joint part (a second plate part 25B of the bracket 25 according to the embodiments, for example) which is joined to the door panel, the beam-side joint part and the panel-side joint part are connected to each other through a convex part (a convex part 25C of the bracket 25 according to the embodiments, for example) which projects inward in the vehicle widthwise direction from the beam-side joint part, and the convex part is placed at a position overlapping the tip part of the door beam in the vehicle widthwise direction.

(5) Further, the door structure for a vehicle according to the aspect of the present invention maybe configured such that the bracket includes: a beam-side joint part (a first plate part 51 of a bracket 50 according to the embodiments, for example) which is located further inward in the vehicle widthwise direction than the inner end side of the door beam in the vehicle widthwise direction and joined to the door beam; and a panel-side joint part (a second plate part 52 of the bracket 50 according to the embodiments, for example) which is joined to the door panel, the beam-side joint part and the panel-side joint part are connected to each other through a concave part (a concave part 53 of the bracket 50 according to the embodiments, for example) which is recessed inward in the vehicle widthwise direction from the beam-side joint part, and the concave part is placed at a position overlapping the tip part of the door beam in the vehicle widthwise direction.

(6) Further, the door structure for a vehicle according to the aspect of the present invention may be configured such that an outer end part of the tip part of the door beam in the vehicle widthwise direction (an outer end part 24A1 of a tip part 24A of the door beam 24 according to the embodiments, for example) is placed further outward in the vehicle widthwise direction than an outer end part of the bracket in the vehicle widthwise direction (an outer end part 25B1 of the second plate part 25B of the bracket 25 according to the embodiments, for example).

(7) Further, the door structure for a vehicle according to the aspect of the present invention may be configured such that the door panel is coupled to the body through a coupling member (a coupling member 28 according to the embodiments, for example), and the coupling member and the bracket are fastened to the door panel with the same fastening member (a fastening member 27 according to the embodiments, for example).

Effect of the Invention

According to the configuration (1) described above, the door beam is mounted on the door panel through the bracket, and the patch member is disposed on the tip part of the door beam at a position overlapping the tip part of the door beam in the vehicle widthwise direction. Accordingly, even when an impact is applied on the door from the side of the vehicle and the impact is transmitted to the bracket through the door beam, the patch member can absorb the impact and prevents the door beam from being shifted in the direction toward the bracket. Thus, it is possible to prevent breakage of the bracket, and thereby restrain the door beam from being fallen off when the impact is applied on the door.

According to the configuration (2) described above, the patch member includes: the first part which is placed further inward in the vehicle widthwise direction than the inner end side of the door beam in the vehicle widthwise direction; and the second part which is placed starting from the front position of the first part, and the patch member has what is called a substantially L-shaped form. Accordingly, even if the door beam is deformed unexpectedly in such a way as to be shifted forward when an impact is applied from the side of the vehicle, it is possible to restrain breakage of the bracket due to deformation of the door beam.

According to the configuration (3) described above, the second part of the patch member is spaced from the bracket. Assuming that the second part of the patch member is joined to the bracket, when an impact is applied from the side of the vehicle, the second part is pulled by the first part of the patch member, and therefore the bend part between the first part and the second part starts such deformation as to become wider. Accordingly, the patch member might be broken due to concentration of force at and around the bend part. In this respect, according to the configuration (3) described above, since the second part of the patch member is spaced from the bracket, it is possible to restrain the patch member from being broken when an impact is applied from the side of the vehicle, and thereby restrain breakage of the bracket due to deformation of the door beam.

According to the configuration (4) described above, the beam-side joint part and the panel-side joint part are connected to each other through the convex part which projects inward in the vehicle widthwise direction from the beam-side joint part. Thereby, even if the door beam is deformed together with the patch member and comes into contact with the bracket when an impact is applied from the side of the vehicle, the convex part of the bracket can be used as a margin for deformation. Moreover, the convex part is placed at a position overlapping the tip part of the door beam. Thereby, the convex part can be used as a free-running space when the tip part of the door beam is rapidly displaced inward in the vehicle widthwise direction. Accordingly, it is possible to restrain breakage of the bracket due to deformation of the door beam in a favorable manner.

According to the configuration (5) described above, the beam-side joint part and the panel-side joint part are connected to each other through the concave part which is recessed inward in the vehicle widthwise direction from the beam-side joint part. Thereby, even if the door beam is deformed together with the patch member and comes into contact with the bracket when an impact is applied from the side of the vehicle, the concave part of the bracket can be used as a margin for deformation. Moreover, the concave part is placed at a position overlapping the tip part of the door beam. Thereby, the concave part can be used as a free-running space when the tip part of the door beam is rapidly displaced inward in the vehicle widthwise direction. Accordingly, it is possible to restrain breakage of the bracket due to deformation of the door beam in a favorable manner.

According to the configuration (6) described above, the outer end part of the bracket is placed further outward in the vehicle widthwise direction than the outer part of the tip part of the door beam. Hence, when an impact is applied from the side of the vehicle, a load generated by the impact is transmitted to the bracket through the door beam. Accordingly, it is possible to prevent the bracket from being deformed before input from the door beam, and thereby achieve a deformation mode according to design precisely.

According to the configuration (7) described above, the coupling member and the bracket are fastened to the door panel with the same fastening member. Accordingly, a force transmitted to the bracket through the door beam when an impact is applied from the side of the vehicle is transmitted from the coupling member to the body through the fastening member. Thereby, energy generated when an impact is applied from the side of the vehicle can be dispersed to the body with a simple configuration.

DETAILED DESCRIPTION OF THE INVENTION

Hereinbelow, embodiments of the present invention are described based on the drawings. Note that, throughout the following description, directional terms "front", "rear", "up", "down", "left", and "right" denote those directions "front", "rear", "up", "down", "left", and "right" in relation to a vehicle, unless otherwise noted.

First Embodiment

Figure 1:
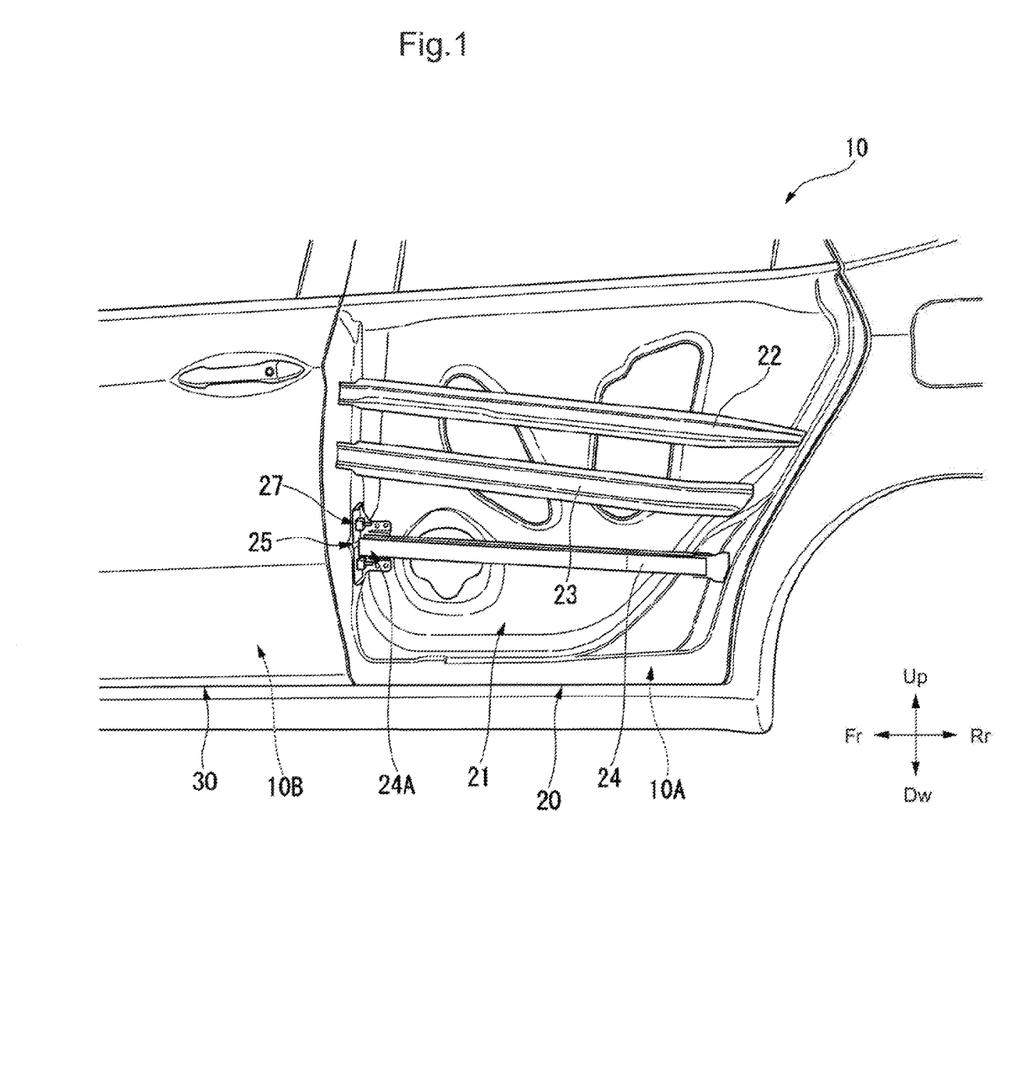
FIG. 1 is a side view of a vehicle which employs a door structure according to an embodiment of the present invention.
Figure 2:
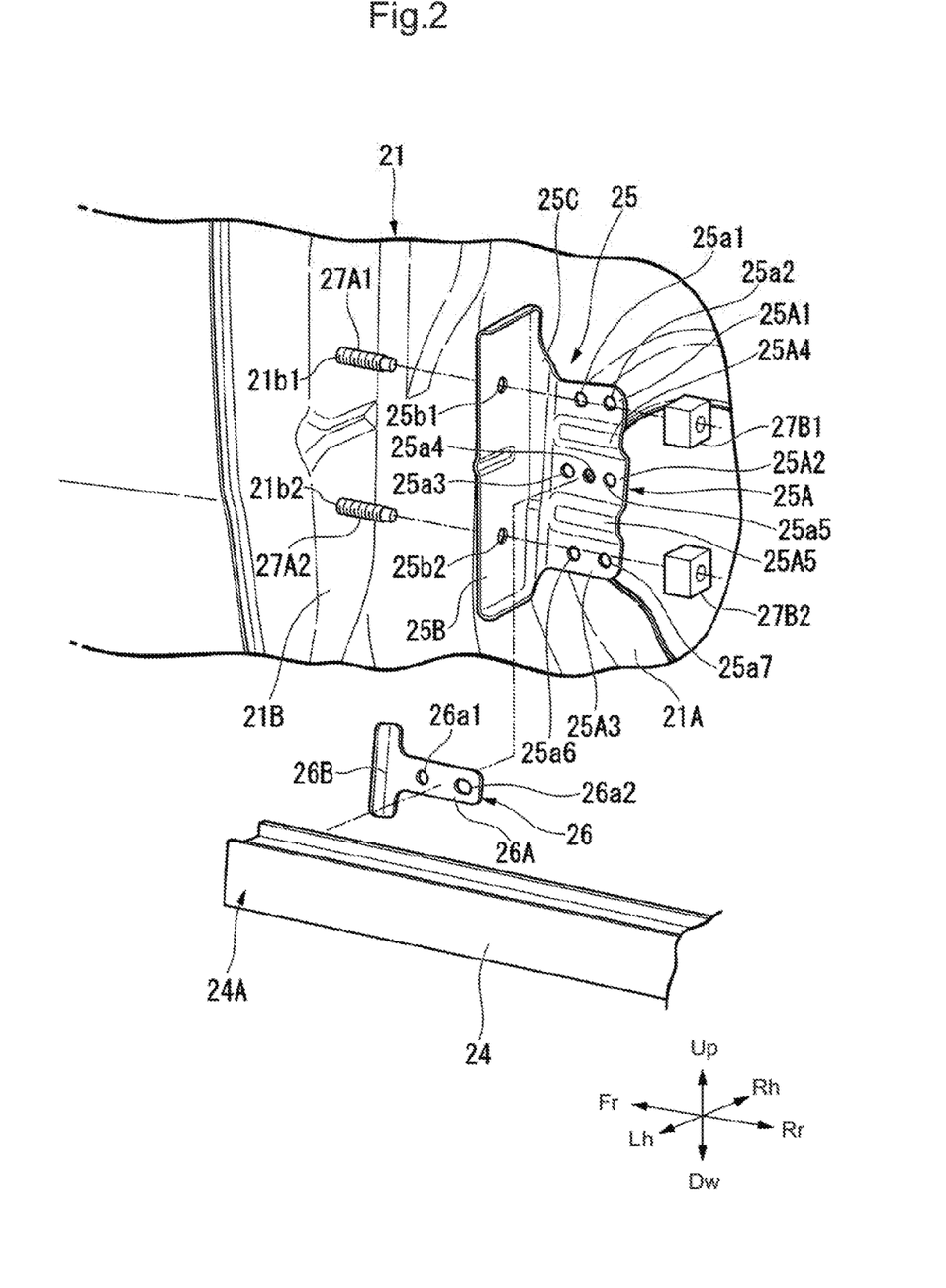
FIG. 2 is an exploded perspective view of a main part of the door structure for a vehicle.
Figure 3:
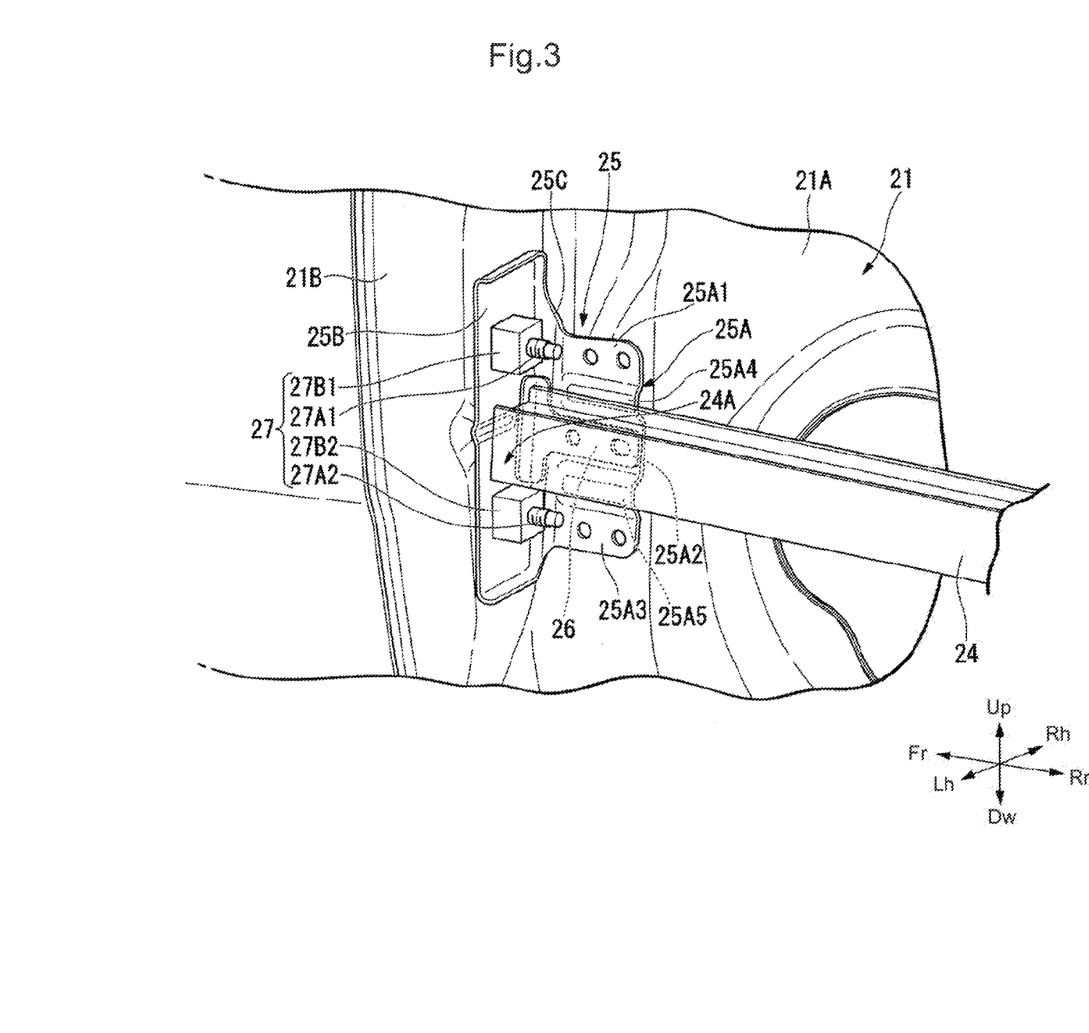
FIG. 3 is a side view of a front end part of the door structure for a vehicle.
Figure 4:
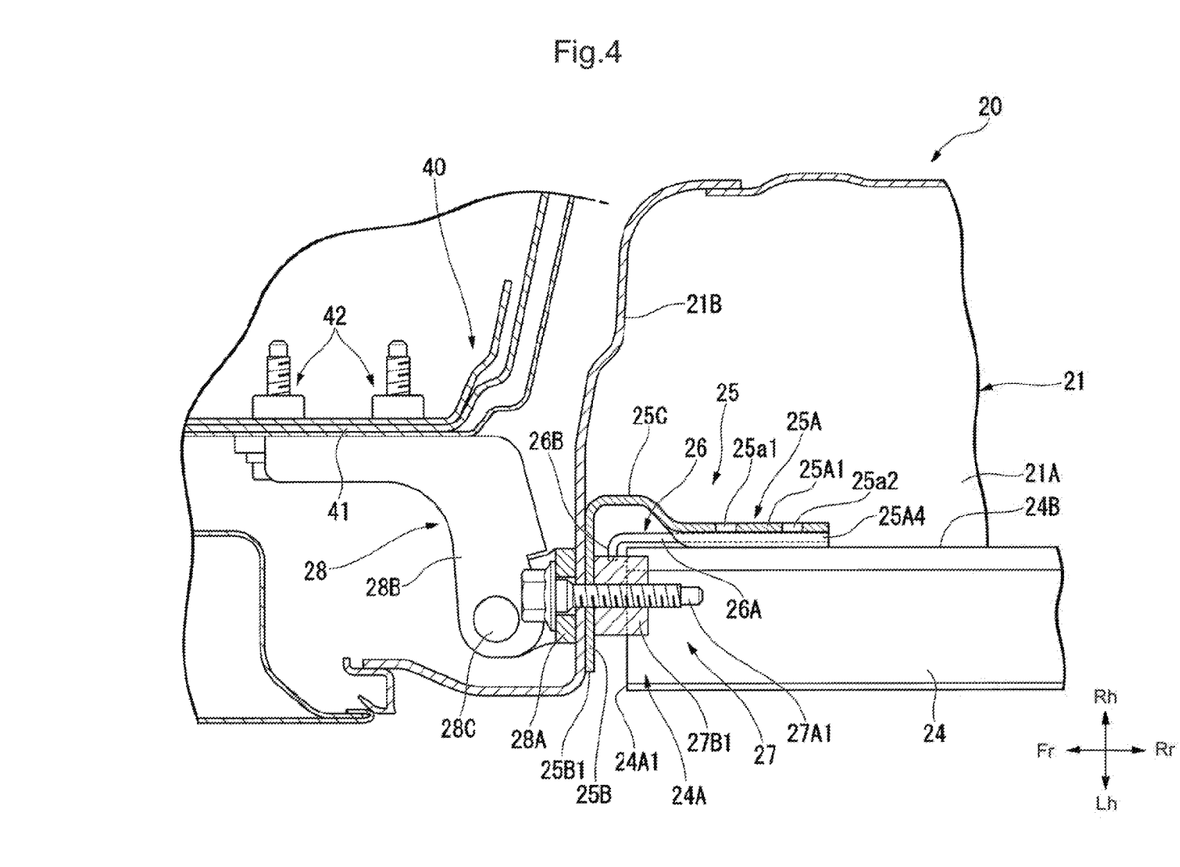
FIG. 4 is a front sectional view of the front end part of the door structure for a vehicle.

First, a first embodiment is described. FIG. 1 is a side view of a vehicle which employs a door structure according to this embodiment at its rear side door. FIG. 1 illustrates a state where an outer panel of the rear side door is detached. FIG. 2 is an exploded perspective view of a main part of the door structure for a vehicle, FIG. 3 is a side view of the main part of the door structure for a vehicle, and FIG. 4 is a front sectional view of the main part of the door structure for a vehicle.

As illustrated in FIG. 1, in a vehicle 10 according to this embodiment, a rear opening 10A is formed, and the rear opening 10A is closed by a rear side door 20. The rear side door 20 is designed to open and close the rear opening 10A of the vehicle 10. In addition, a front opening 10B is formed ahead of the rear opening 10A of the vehicle 10, and a front side door 30 installed in the vehicle 10 is designed to open and close the front opening 10B. A metal part of the vehicle 10 including the rear side door 20 and the front side door 30 is made of light nonferrous metal such as aluminum, but it may be partially or wholly made of metal other than aluminum such as iron.

The rear side door 20 includes an inner panel 21 as a door panel. The inner panel 21 includes a first reinforcement member 22 and a second reinforcement member 23. The first reinforcement member 22 and the second reinforcement member 23 are each a long member formed along the longitudinal direction of the vehicle, and the first reinforcement member 22 is placed above the second reinforcement member 23.

A door beam 24 is disposed below the second reinforcement member 23. The door beam 24 is a long member placed along the longitudinal direction of the vehicle 10, and is a hollow member having a hollow part in a central part of its cross section. A front end part and a rear end part of the door beam 24 are both joined to the inner panel 21. Of these parts, a side face of a tip part 24A of the door beam 24 is joined to the inner panel 21 through a bracket 25.

As illustrated in FIGS. 2 and 3, the bracket 25 includes: a first plate part 25A as a beam-side joint part; and a second plate part 25B as a panel-side joint part. Of these parts, the first plate part 25A extends in the longitudinal direction, and the second plate part 25B extends in the vehicle widthwise direction. In addition, a convex part 25C is formed between the first plate part 25A and the second plate part 25B. The convex part 25C is formed to project inward in the vehicle widthwise direction from the first plate part 25A. The first plate part 25A, the second plate part 25B, and the convex part 25C are formed integrally.

The first plate part 25A of the bracket 25 is formed of: an upper plate part 25A1; a middle plate part 25A2; and a lower plate part 25A3. An upper concave part 25A4 is formed between the upper plate part 25A1 and the middle plate part 25A2, and a lower concave part 25A5 is formed between the middle plate part 25A2 and the lower plate part 25A3.

In the first plate part 25A of the bracket 25, two through holes 25a1 and 25a2 which are spaced from each other in the longitudinal direction are formed in the upper plate part 25A1, and three through holes 25a3, 25a4, and 25a5 which are spaced from one another in the longitudinal direction at substantially equal intervals are formed in the middle plate part 25A2. Moreover, two through holes 25a6 and 25a7 which are spaced from each other in the longitudinal direction are formed in the lower plate part 25A3. In the bracket 25, through holes 25b1 and 25b2 are formed in the second plate part 25B at its upper and lower positions in the height direction.

In the inner panel 21, a side face part 21A which extends in the longitudinal direction is formed at a position further inward in the vehicle widthwise direction relative to a location where the tip part 24A of the door beam 24 is placed, and a front face part 21B which extends in the vehicle widthwise direction is formed ahead of the side face part 21A. The first plate part 25A of the bracket 25 is joined to the side face part 21A of the inner panel 21, and the second plate part 25B of the bracket is joined to the front face part 21B.

In addition, a patch member 26 is interposed between the first plate part 25A of the bracket 25 and the door beam 24. The patch member 26 includes: a platy first part 26A which extends in the longitudinal direction; and a second part 26B which bends from the first part 26A and extends in the vehicle widthwise direction from a front end position (front position) of the first part 26A.

The first part 26A of the patch member 26 is in contact with the first plate part 25A of the bracket 25 and the door beam 24, and the door beam 24 is joined to the bracket 25 through the first part 26A of the patch member 26. The second part 26B of the patch member 26 is placed between the door beam 24 and the second plate part 25B of the bracket 25, but is spaced from the door beam 24 and the bracket 25.

Two through holes 26a1 and 26a2 which are spaced from each other in the longitudinal direction are formed in the first part 26A of the patch member 26. The clearance between the through holes 26a1 and 26a2 is almost the same as the clearance between the through holes 25a3 and 25a5 formed on the front and rear sides of the middle plate part 25A2 of the first plate part 25A of the bracket 25.

The front face part 21B of the inner panel 21 and the second plate part 25B of the bracket 25 are fastened to each other with a fastening member 27. The fastening member 27 is formed of: bolts 27A1 and 27A2 whose head parts are located in a front part and whose axial direction extends in the longitudinal direction; and nuts 27B1 and 27B2 which are screwed onto screw parts of the bolts 27A1 and 27A2. Through holes 21b1 and 21b2 which are spaced from each other in the vertical direction are formed in the front face part 21B of the inner panel 21. The clearance between the through holes 21b1 and 21b2 is almost the same as the through holes 25b1 and 25b2 formed in the second plate part 25B of the bracket 25.

The bolt 27A1 has the head part placed ahead of the front face part 21B of the inner panel 21, and penetrates the through hole 21b1 formed in the front face part 21B of the inner panel 21 and the through hole 25b1 formed in the second plate part 25B of the bracket 25. The nut 27B1 is screwed onto the screw part of the bolt 27A1. Likewise, the bolt 27A2 has the head part placed ahead of the front face part 21B of the inner panel 21, and penetrates the through hole 21b2 formed in the front face part 21B of the inner panel 21 and the through hole 25b2 formed in the second plate part 25B of the bracket 25. The nut 27B2 is screwed onto the screw part of the bolt 27A2. In this way, the front face part 21B of the inner panel 21 and the second plate part 25B of the bracket 25 are fastened to each other with the fastening member 27.

In addition, the first plate part 25A of the bracket 25 and the first part 26A of the patch member 26 are fastened to each other with bolts and nuts which penetrate the through holes 25a3 and 25a5 formed on the front and rear sides of the middle plate part 25A2 of the first plate part 25A and the through holes 26a1 and 26a2 formed in the first part 26A. The head parts of these bolts are sandwiched between the first part 26A of the patch member 26 and the door beam 24, and the screw parts of the bolts are inserted into the through holes 26a1 and 26a2 of the first part 26A from outside the through holes.

Moreover, the door beam 24 is joined by MIG welding to the upper concave part 25A4 and the lower concave part 25A5 of the first plate part 25A of the bracket 25. Each of the upper concave part 25A4 and the lower concave part 25A5 of the first plate part 25A is deeper than the thickness of the first part 26A of the patch member 26. Thus, as illustrated in FIG. 4, the first part 26A of the patch member 26 is placed so as to be sandwiched between the middle plate part 25A2 of the first plate part 25A and an inner side face of the door beam 24.

Further, as illustrated in FIG. 4, the second part 26B of the patch member 26 is placed ahead of a tip face of the door beam 24. Hence, the second part 26B of the patch member 26 and the door beam 24 are spaced from each other and are in non-contact with each other. Moreover, an outer end part 24A1 of the tip part 24A of the door beam 24 is placed outside an outer end part 25B1 of the second plate part 25B of the bracket 25.

Furthermore, the inner panel 21 of the rear side door 20 is coupled to a frame 41 of a body 40 through a coupling member 28. The coupling member 28 includes a first hinge member 28A and a second hinge member 28B. The first hinge member 28A is installed on the rear side door 20, whereas the second hinge member 28B is installed on the body 40. The first hinge member 28A and the second hinge member 28B are assembled together with a pin 28C. The rear side door 20 is opened and closed by turning the first hinge member 28A about the pin 28C.

The second hinge member 28B is joined to the inner panel 21 with the fastening member 27. The inner panel 21 and the bracket 25 are also joined together with the fastening member 27, i.e., the fastening member 27 fastens the coupling member 28, the inner panel 21, and the bracket 25 together. Thus, the coupling member 28 and the bracket 25 are fastened to the inner panel 21 of the rear side door 20 with the same fastening member 27. In addition, the second hinge member 28B is joined to the frame 41 with bolts and nuts 42, 42. Incidentally, the coupling member 28 also includes a latch, a roller, and a rail (not illustrated) for opening and closing the rear side door 20.

In the door structure for a vehicle according to this embodiment having the above configuration, the tip part 24A of the door beam 24 is attached to the inner panel 21 through the bracket 25. The patch member 26 is disposed on the tip part 24A of the door beam 24 at a position overlapping the tip part 24A of the door beam 24 in the vehicle widthwise direction. When the vehicle 10 causes a side collision, for example, and an impact is applied from the side of the rear side door 20, the patch member 26 can absorb the impact transmitted from the door beam 24 to the inner panel 21 through the bracket 25. Thus, it is possible to prevent the door beam 24 from being shifted in the direction toward the bracket 25, and thereby restrain the door beam 24 from being fallen off when the impact from the side is applied on the rear side door 20.

In addition, the patch member 26 has a substantially L-shaped form including: the first part 26A which is placed further inward in the vehicle widthwise direction than an inner end side 24B of the door beam 24 in the vehicle widthwise direction; and the second part 26B which is placed starting from the front end position of the first part 26A. Accordingly, if the door beam 24 is deformed unexpectedly in such a way as to be shifted in the longitudinal direction, e.g., if the door beam 24 is shifted forward, when an impact is applied from the side of the vehicle 10, the door beam thus shifted can be received by the second part 26B of the patch member 26. Thereby, it is possible to restrain the bracket 25 from being broken when the door beam 24 is deformed in such a way as to be shifted forward.

Further, the second part 26B of the patch member 26 is spaced from the bracket 25. Assuming that the second part 26B of the patch member 26 is joined to the bracket 25, when an impact is applied from the side of the rear side door 20, the second part 26B is pulled by the first part 26A of the patch member 26, and therefore the bend part between the first part 26A and the second part 26B starts such deformation as to become wider. Accordingly, the patch member 26 might be broken due to concentration of force at and around the bend part. In this respect, since the second part 26B of the patch member 26 is spaced from the bracket 25 and is in non-contact with the bracket, it is possible to restrain the patch member 26 from being broken when an impact is applied from the side of the rear side door 20, and thereby restrain breakage of the bracket 25 due to deformation of the door beam 24 in a favorable manner.

Furthermore, the first plate part 25A and the second plate part 25B are connected to each other through the convex part 25C which projects inward in the vehicle widthwise direction from the first plate part 25A. Thereby, even if the door beam 24 is deformed together with the patch member 26 and comes into contact with the bracket 25 when an impact is applied from the side of the rear side door 20, the convex part 25C of the bracket 25 can be used as a margin for deformation. Moreover, since the convex part 25C is placed at a position overlapping the tip part 24A of the door beam 24, the convex part 25C can be used as a free-running space when the tip part 24A of the door beam 24 is rapidly displaced inward in the vehicle widthwise direction. Accordingly, it is possible to restrain breakage of the bracket 25 due to deformation of the door beam 24 in a favorable manner.

In addition, as illustrated in FIG. 4, the outer end part 25B1 of the bracket 25 is placed further outward in the vehicle widthwise direction than an outer part, which is the outer end part 24A1, of the tip part 24A of the door beam 24 in the vehicle widthwise direction. Hence, when an impact is applied from the side of the rear side door 20, a load generated by the impact is transmitted to the bracket 25 through the door beam 24. Accordingly, it is possible to prevent the bracket 25 from being deformed before input from the door beam 24, and thereby achieve a deformation mode according to design precisely.

Further, the coupling member 28 and the bracket 25 are fastened to the inner panel 21 of the rear side door 20 with the same fastening member 27. Accordingly, a force transmitted to the bracket 25 through the door beam 24 when an impact is applied from the side of the rear side door 20 is transmitted from the coupling member 28 to the body 40 through the fastening member 27. Thereby, energy generated when an impact is applied from the side of the rear side door 20 can be dispersed to the body 40 with a simple configuration.

Second Embodiment

Next, a second embodiment is described. A door structure according to this embodiment differs from the first embodiment mainly in terms of the shape of the bracket. Hereinbelow, this embodiment is described mainly in terms of the difference from the first embodiment. Note that members also used in the first embodiment are given the same reference numerals and are not described here.

Figure 5:
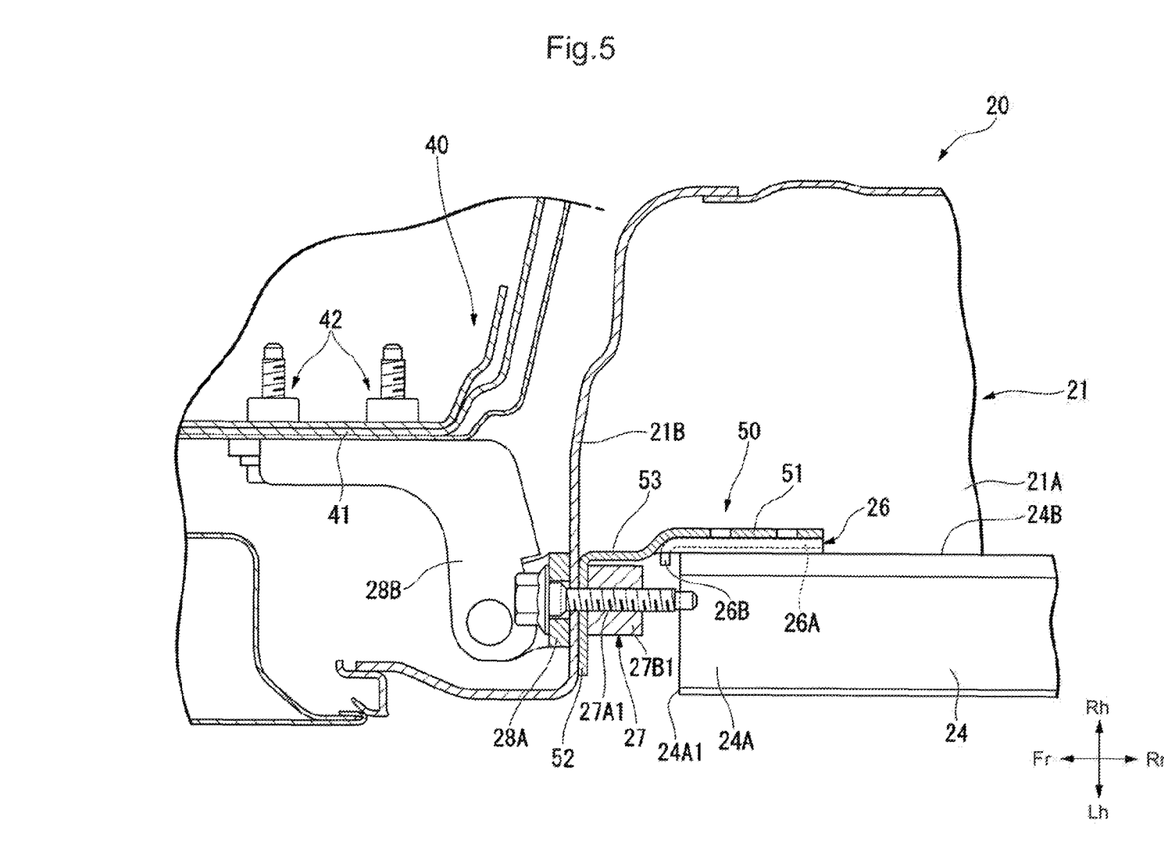
FIG. 5 is a front sectional view of a front end part of a door structure for a vehicle according to another embodiment of the present invention.

FIG. 5 is a front sectional view of the door structure for a vehicle according to this embodiment. As illustrated in FIG. 5, in this embodiment, a bracket 50 includes: a first plate part 51 as a beam-side joint part; and a second plate part 52 as a panel-side joint part. Of these parts, the first plate part 51 extends in the longitudinal direction, and the second plate part 52 extends in the vehicle widthwise direction. In addition, a concave part 53 is formed between the first plate part 51 and the second plate part 52. The concave part 53 is formed to project outward in the vehicle widthwise direction from the first plate part 51, and is recessed inward in the vehicle widthwise direction. The first plate part 51, second plate part 52, and the concave part 53 are formed integrally.

As in the first plate part 25A of the bracket 25 according to the first embodiment, the first plate part 51 of the bracket 50 is formed of an upper plate, a middle plate, and a lower plate. An upper concave part is formed between the upper plate and the middle plate, and a lower concave part is formed between the middle plate and the lower plate.

In addition, the upper plate, the middle plate, and the lower plate of the first plate part 51 have through holes formed at the same positions as the seven through holes 25a1 to 25a7 formed in the first embodiment. The second plate part 52 also has through holes formed at the same positions as the through holes 25b1 and 25b2 formed in the second plate part 25B in the first embodiment.

The door structure for a vehicle according to this embodiment having the above configuration brings about the same operation/working-effects as the operation/working-effects indicated in the first embodiment. Moreover, the first plate part 51 and the second plate part 52 are connected to each other through the concave part 53 which is recessed inward in the vehicle widthwise direction from the first plate part 51. Thereby, even if the door beam 24 is deformed together with the patch member 26 and comes into contact with the bracket 25 when an impact is applied from the side of the rear side door 20, the concave part 53 of the bracket 25 can be used as a margin for deformation. Accordingly, it is possible to restrain breakage of the bracket 25 due to deformation of the door beam 24 in a favorable manner.

Note that the present invention is not limited to what is described in the foregoing embodiments, and various design changes maybe be made without departing from the gist thereof. For example, the joined parts that are joined together by fastening the bolts and nuts maybe joined by welding instead. Further, the joined parts that are joined together by welding may be joined by fastening bolts and nuts instead.

DESCRIPTION OF REFERENCE NUMERALS

10 VEHICLE
10A REAR OPENING
20 REAR SIDE DOOR
21 INNER PANEL
22 FIRST REINFORCEMENT MEMBER
23 SECOND REINFORCEMENT MEMBER
24 DOOR BEAM
24A TIP PART
24A1 OUTER END PART
24B INNER END SIDE
25, 50 BRACKET
25A, 51 FIRST PLATE PART
25B, 52 SECOND PLATE PART
25C CONVEX PART
26 PATCH MEMBER
26A FIRST PART
26B SECOND PART
27 FASTENING MEMBER
28 COUPLING MEMBER
40 BODY
53 CONCAVE PART

The invention claimed is:

1. A door structure for a vehicle having a door configured to open and close an opening formed in a vehicle body, the door structure comprising:
    the door having an inner panel which has an outer side in a vehicle widthwise direction of said vehicle body; and
    a door beam mounted to the outer side of said inner panel and having an elongated body disposed along a longitudinal direction of said vehicle body, the door beam having one end in the longitudinal direction;
    a bracket disposed between said door beam and said inner panel though which said door beam is mounted on said inner panel; and
    a patch member disposed on said one end of said door beam at a position overlapping said one end of said door beam in the vehicle widthwise direction,
    wherein said patch member is disposed in the door structure such that said patch member is spaced from said inner panel and is in non-contact with said inner panel.

2. The door structure according to claim 1, wherein said patch member comprises:
    a first plate-shaped part; and
    a second part which bends from said first part,
    said first part is placed inward in the vehicle widthwise direction than an inner side of said door beam in the vehicle widthwise direction, and
    said second part bends and extends from a front end of said first part such that said second part is placed in front of the one end of said door beam.

3. The door structure according to claim 2, wherein said first part of said patch member is joined to said bracket, and
    said second part is spaced from said bracket.

4. The door structure according to claim 1, wherein said bracket comprises:
    a beam-side joint part located inward in the vehicle widthwise direction than an inner side of said door beam in the vehicle widthwise direction and joined to said inner side of said door beam;
    a panel-side joint part joined to said door panel; and
    a convex part which projects inward in the vehicle widthwise direction from said beam-side joint part, connecting said beam-side joint part and said panel-side joint part are connected to each other through the convex part, and
    said convex part is placed at a position overlapping said one end of said door beam in the vehicle widthwise direction.

5. The door structure according to claim 1, wherein said bracket comprises:
    a beam-side joint part located inward in the vehicle widthwise direction than said inner side of said door beam in the vehicle widthwise direction and joined to said inner side of said door beam;
    a panel-side joint part joined to said door panel; and
    a concave part recessed inward in the vehicle widthwise direction from said beam-side joint part, connecting said beam-side joint part and said panel-side joint part to each other through the concave part, and
    said concave part is placed at a position overlapping said one end of said door beam in the vehicle widthwise direction.

6. The door structure according to claim 1, wherein an outer end part of said one end of said door beam in the vehicle widthwise direction is placed outward in the vehicle widthwise direction than an outer end part of said bracket in the vehicle widthwise direction.

7. The door structure according to claim 1, further comprising:
    a coupling member which couples said door panel to said vehicle body; and
    a fastening member fastening both said coupling member and said bracket to said door panel.

8. The door structure according to claim 2, wherein said second part of said patch member is spaced from said door beam and is in non-contact with said door beam.

* * * * *